United States Patent
Shono et al.

(10) Patent No.: US 11,001,779 B2
(45) Date of Patent: May 11, 2021

(54) REFRIGERATOR OIL AND REFRIGERATOR WORKING FLUID COMPOSITION

(71) Applicant: ENEOS Corporation, Tokyo (JP)

(72) Inventors: Yohei Shono, Tokyo (JP); Kentaro Yamaguchi, Tokyo (JP); Yuya Mizutani, Tokyo (JP); Takeshi Okido, Tokyo (JP); Hidetoshi Ogata, Tokyo (JP)

(73) Assignee: ENEOS CORPORATION, Tokyo (JP)

( * ) Notice: Subject to any disclaimer, the term of this patent is extended or adjusted under 35 U.S.C. 154(b) by 0 days.

(21) Appl. No.: 16/327,444

(22) PCT Filed: Sep. 14, 2017

(86) PCT No.: PCT/JP2017/033301
§ 371 (c)(1),
(2) Date: Feb. 22, 2019

(87) PCT Pub. No.: WO2018/052088
PCT Pub. Date: Mar. 22, 2018

(65) Prior Publication Data
US 2019/0194567 A1 Jun. 27, 2019

(30) Foreign Application Priority Data

Sep. 15, 2016 (JP) .............. JP2016-180575

(51) Int. Cl.
| | |
|---|---|
| *C09K 5/04* | (2006.01) |
| *C10M 137/10* | (2006.01) |
| *C10M 171/00* | (2006.01) |
| *C10M 169/04* | (2006.01) |
| *C10M 105/38* | (2006.01) |
| *C10N 20/00* | (2006.01) |
| *C10N 30/10* | (2006.01) |
| *C10N 40/30* | (2006.01) |

(52) U.S. Cl.
CPC ........... *C10M 137/105* (2013.01); *C09K 5/04* (2013.01); *C09K 5/045* (2013.01); *C10M 105/38* (2013.01); *C10M 169/04* (2013.01); *C10M 171/008* (2013.01); *C09K 2205/126* (2013.01); *C10M 2207/026* (2013.01); *C10M 2207/042* (2013.01); *C10M 2207/2805* (2013.01); *C10M 2207/2835* (2013.01); *C10M 2223/047* (2013.01); *C10N 2020/101* (2020.05); *C10N 2030/10* (2013.01); *C10N 2040/30* (2013.01)

(58) Field of Classification Search
CPC ...................... C10M 2207/28; C10M 137/105
See application file for complete search history.

(56) References Cited

U.S. PATENT DOCUMENTS

| | | | |
|---|---|---|---|
| 2004/0053794 | A1 | 3/2004 | Baba |
| 2010/0093568 | A1* | 4/2010 | Tagawa ................ C10M 101/02 508/133 |
| 2013/0237463 | A1 | 9/2013 | Yagishita |
| 2015/0337231 | A1 | 11/2015 | Sato |
| 2017/0198236 | A1* | 7/2017 | Hiyoshi ............... C10M 169/04 |
| 2017/0240834 | A1 | 8/2017 | Takahashi et al. |

FOREIGN PATENT DOCUMENTS

| | | |
|---|---|---|
| JP | 5-70785 | 3/1993 |
| JP | 2002-265971 | 9/2002 |
| JP | 2012-111803 | 6/2012 |
| JP | 2014-118534 | 6/2014 |
| JP | 2015-25114 | 2/2015 |
| JP | 2015-25115 | 2/2015 |
| JP | 2016-98256 | 5/2016 |
| WO | 2016/072296 | 5/2016 |

OTHER PUBLICATIONS

International Search Report in International Patent Application No. PCT/JP2017/033301 dated Oct. 17, 2017.
International Preliminary Report on Patentability (IPRP) in International Patent Application No. PCT/JP2017/033301, dated Mar. 28, 2019 with English translation.

* cited by examiner

*Primary Examiner* — John R Hardee
(74) *Attorney, Agent, or Firm* — Greenblum & Bernstein, P.L.C.

(57) ABSTRACT

The present invention, in one aspect, provides a refrigerating machine oil including a lubricating base oil and a compound represented by the following formula (A):

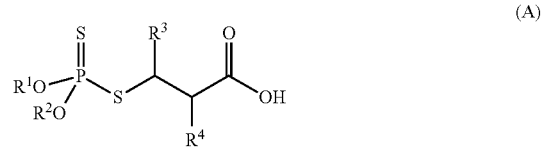

wherein $R^1$ and $R^2$ each independently represent a monovalent hydrocarbon group, and $R^3$ and $R^4$ each independently represent a hydrogen atom or an alkyl group, the refrigerating machine oil being used with a refrigerant including an unsaturated hydrofluorocarbon.

18 Claims, No Drawings

REFRIGERATOR OIL AND REFRIGERATOR WORKING FLUID COMPOSITION

TECHNICAL FIELD

The present invention relates to a refrigerating machine oil and a working fluid composition for a refrigerating machine.

BACKGROUND ART

As refrigerants which can be used for refrigerating machines such as refrigerators, car air-conditioners, room air-conditioners, and automatic vending machines, known are saturated hydrofluorocarbon refrigerants (may also be referred to as HFC refrigerants), unsaturated hydrofluorocarbon refrigerants (may also be referred to as HFO refrigerants), and the like.

Refrigerating machines are also provided with compressors for circulating refrigerants through their refrigerating cycles. These compressors are, in turn, filled with refrigerating machine oils for lubricating slide members. Such a refrigerating machine oil is usually developed to suit a particular refrigerant used in a refrigerating machine because the refrigerating machine oil may show different properties (for example, compatibility with a refrigerant) depending on the refrigerant.

In recent years, an unsaturated hydrofluorocarbon refrigerant having a small global warming potential has particularly been investigated in view of preventing global warming. For example, Patent Literature 1 discloses a refrigerating machine oil having excellent compatibility with a trifluoroethylene refrigerant (HFO-1123) as one of unsaturated hydrofluorocarbon refrigerants.

CITATION LIST

Patent Literature

Patent Literature 1: Japanese Unexamined Patent Publication No. 2016-98256

SUMMARY OF INVENTION

Technical Problem

Disadvantageously, an unsaturated hydrofluorocarbon refrigerant having a carbon-carbon double bond in the molecule is, however, more susceptible to decomposition than a saturated hydrofluorocarbon having no carbon-carbon double bond in the molecule, for example.

In view of the above, an object of the present invention is to provide a refrigerating machine oil and a working fluid composition for a refrigerating machine which can prevent decomposition of an unsaturated hydrofluorocarbon refrigerant.

Solution to Problem

The present invention, in one aspect, provides a refrigerating machine oil including a lubricating base oil and a compound represented by the following formula (A):

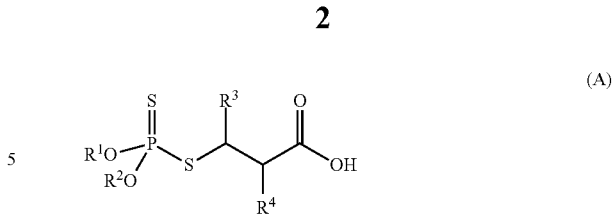

wherein $R^1$ and $R^2$ each independently represent a monovalent hydrocarbon group, and $R^3$ and $R^4$ each independently represent a hydrogen atom or an alkyl group, the refrigerating machine oil being used with a refrigerant including an unsaturated hydrofluorocarbon.

The refrigerating machine oil may include, as the lubricating base oil, an ester of a polyhydric alcohol and a fatty acid including 50 to 100% by mole of a branched fatty acid having 4 to 9 carbon atoms.

According to another aspect of the present invention, provided is a working fluid composition for a refrigerating machine, including the above refrigerating machine oil and a refrigerant including an unsaturated hydrofluorocarbon.

In each of the above aspects, the refrigerant may include 1,1,2-trifluoroethylene as the unsaturated hydrofluorocarbon, and may further include a saturated hydrofluorocarbon.

Advantageous Effects of Invention

The present invention can provide a refrigerating machine oil and a working fluid composition for a refrigerating machine which can prevent decomposition of an unsaturated hydrofluorocarbon refrigerant.

DESCRIPTION OF EMBODIMENTS

A refrigerating machine oil according to one embodiment comprises a lubricating base oil and a compound represented by the following formula (A):

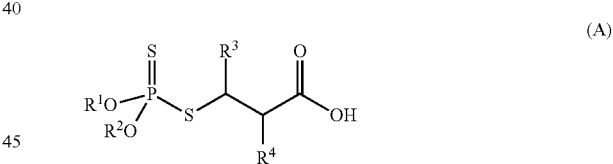

wherein $R^1$ and $R^2$ each independently represent a monovalent hydrocarbon group, and $R^3$ and $R^4$ each independently represent a hydrogen atom or an alkyl group.

Examples of the lubricating base oil include hydrocarbon oils, oxygen-containing oils, and the like. Examples of the hydrocarbon oils include mineral oil-based hydrocarbon oils and synthetic hydrocarbon oils. Examples of the oxygen-containing oils include esters, ethers, carbonates, ketones, silicones, and polysiloxanes.

The mineral oil-based hydrocarbon oils can be obtained by refining a lubricant fraction obtainable from atmospheric distillation and vacuum distillation of paraffinic, naphthenic, or other crude oils according to a method(s) such as solvent deasphalting, solvent refining, hydrorefining, hydrogenolysis, solvent dewaxing, hydrodewaxing, clay treatment, and sulfuric-acid treatment. These refining methods may be used alone or in combination of two or more.

The synthetic hydrocarbon oils include alkylbenzenes, alkylnaphthalenes, poly-α-olefins (PAO), polybutenes, ethylene-α-olefin copolymers, and the like.

The alkylbenzene may be at least one selected from the group consisting of an alkylbenzene (X) and an alkylbenzene (Y) described below.

The alkylbenzene (X): an alkylbenzene having 1 to 4 alkyl groups having 1 to 19 carbon atoms, in which the total number of carbon atoms in the alkyl group(s) is 9 to 19 (preferably an alkylbenzene having 1 to 4 alkyl groups having 1 to 15 carbon atoms, in which the total number of carbon atoms in the alkyl group(s) is 9 to 15).

The alkylbenzene (Y): an alkylbenzene having 1 to 4 alkyl groups having 1 to 40 carbon atoms, in which the total number of carbon atoms in the alkyl group(s) is 20 to 40 (preferably an alkylbenzene having 1 to 4 alkyl groups having 1 to 30 carbon atoms, in which the total number of carbon atoms in the alkyl group(s) is 20 to 30)

Specific examples of the alkyl group(s) having 1 to 19 carbon atoms in the alkylbenzene (X) include a methyl group, an ethyl group, a propyl group (including all isomers; the same applies hereinafter), a butyl group, a pentyl group, a hexyl group, a heptyl group, an octyl group, a nonyl group, a decyl group, an undecyl group, a dodecyl group, a tridecyl group, a tetradecyl group, a pentadecyl group, a hexadecyl group, a heptadecyl group, an octadecyl group, a nonadecyl group, and an eicosyl group. These alkyl groups may be linear or branched, and are preferably branched in view of stability, viscosity properties, and the like. Especially in view of availability, the alkyl groups are more preferably branched alkyl groups which can be derived from oligomers of olefins such as propylene, butene, and isobutylene.

The number of alkyl groups in the alkylbenzene (X) is 1 to 4, and preferably 1 or 2 (that is, monoalkylbenzene, dialkylbenzene, or mixtures thereof) in view of stability and availability.

The alkylbenzene (X) may include only one type of alkylbenzene having a unitary structure, or may include a mixture of alkylbenzenes having different structures as long as they include 1 to 4 alkyl groups having 1 to 19 carbon atoms, and the total number of carbon atoms in the alkyl group(s) is 9 to 19.

Specific examples of the alkyl group(s) having 1 to 40 carbon atoms in the alkylbenzene (Y) include a methyl group, an ethyl group, a propyl group (including all isomers; the same applies hereinafter), a butyl group, a pentyl group, a hexyl group, a heptyl group, an octyl group, a nonyl group, a decyl group, an undecyl group, a dodecyl group, a tridecyl group, a tetradecyl group, a pentadecyl group, a hexadecyl group, a heptadecyl group, an octadecyl group, a nonadecyl group, an icosyl group, a henicosyl group, a docosyl group, a tricosyl group, a tetracosyl group, a pentacosyl group, a hexacosyl group, a heptacosyl group, an octacosyl group, a nonacosyl group, a triacontyl group, a hentriacontyl group, a dotriacontyl group, a tritriacontyl group, a tetratriacontyl group, a pentatriacontyl group, a hexatriacontyl group, a heptatriacontyl group, an octatriacontyl group, a nonatriacontyl group, and a tetracontyl group. These alkyl groups may be linear or branched, and are preferably branched in view of stability, viscosity properties, and the like. Especially in view of availability, the alkyl groups are more preferably branched alkyl groups which can be derived from oligomers of olefins such as propylene, butene, and isobutylene. In view of a more flash point, the alkyl groups are more preferably linear or branched alkyl groups which can be derived from linear alkylating agents such as normal paraffin, normal-α-olefin, or halides thereof, and are even more preferably branched alkyl groups.

The number of alkyl groups in the alkylbenzene (Y) is 1 to 4, and is preferably 1 or 2 (that is, monoalkylbenzene, dialkylbenzene, or mixtures thereof) in view of stability and availability.

The alkylbenzene (Y) may include only one type of alkylbenzene having a unitary structure, or may include a mixture of alkylbenzenes having different structures as long as they include 1 to 4 alkyl groups having 1 to 40 carbon atoms, and the total number of carbon atoms in the alkyl group(s) is 20 to 40.

A poly-α-olefins (PAO) can be obtained as follows: for example, several molecules of a linear olefin having 6 of 18 carbon atoms and having a double bond only at one end are polymerized, and then hydrogenated. The poly-α-olefin may be an isoparaffin having a molecular weight distribution mainly including, for example, a trimer or tetramer of α-decene having 10 carbon atoms or α-dodecene having 12 carbon atoms.

Examples of the ester include aromatic esters, dibasic acid esters, polyol esters, complex esters, carbonate esters, and mixtures thereof. The ester is preferably a polyol ester or a complex ester.

The polyol ester is an ester of polyhydric alcohol and fatty acid. The fatty acid is preferably a saturated fatty acid. The number of carbon atoms of the fatty acid is preferably 4 to 20, more preferably 4 to 18, even more preferably 4 to 9, and particularly preferably 5 to 9. The polyol ester may be a partial ester in which some of the hydroxy groups of polyhydric alcohol remain unesterified, or may be a complete ester in which all the hydroxy groups are esterified, or may be a mixture of a partial ester and a complete ester. The polyol ester preferably has a hydroxy value of 10 mg KOH/g or less, more preferably 5 mg KOH/g or less, and even more preferably 3 mg KOH/g or less.

The ratio of the fatty acid having 4 to 20 carbon atoms is preferably 20 to 100% by mole, more preferably 50 to 100% by mole, even more preferably 70 to 100% by mole, and particularly preferably 90 to 100% by mole, based on the total fatty acid constituting the poly ester.

Specific examples of the fatty acid having 4 to 20 carbon atoms include butanoic acid, pentanoic acid, hexanoic acid, heptanoic acid, octanoic acid, nonanoic acid, decanoic acid, undecanoic acid, dodecanoic acid, tridecanoic acid, tetradecanoic acid, pentadecanoic acid, hexadecanoic acid, heptadecanoic acid, octadecanoic acid, nonadecanoic acid, and icosanoic acid. These types of the fatty acid may be linear or branched. The fatty acid is preferably branched at the α and/or β positions, and more preferably selected from 2-methylpropanoic acid, 2-methylbutanoic acid, 2-methylpentanoic acid, 2-methylhexanoic acid, 2-ethylpentanoic acid, 2-methylheptanoic acid, 2-ethylhexanoic acid, 3,5,5-trimethylhexanoic acid, and 2-ethylhexadecanoic acid, and even more preferably selected from 2-methylpropanoic acid and 3,5,5-trimethylhexanoic acid.

The fatty acid preferably includes branched fatty acid having 4 to 9 carbon atoms among these types of fatty acid. The ratio of branched fatty acid having 4 to 9 carbon atoms in the fatty acid is preferably 20 to 100% by mole, more preferably 50 to 100% by mole, even more preferably 70 to 100 mole %, and particularly preferably 90 to 100% by mole.

The fatty acid may include fatty acid having a number of carbon atoms other than 4 to 20. For example, the fatty acid having a number of carbon atoms other than 4 to 20 may have a number of carbon atoms of 21 to 24. Fatty acid having 21 to 24 carbon atoms may be heneicosanoic acid, docosanoic acid, tricosanoic acid, tetracosanoic acid, or the like, and may be linear or branched.

The polyhydric alcohol constituting the polyol ester preferably has 2 to 6 hydroxy groups. The number of carbon atoms of the polyhydric alcohol is preferably 4 to 12, more preferably 5 to 10. The polyhydric alcohol is preferably a hindered alcohol such as neopentyl glycol, trimethylolethane, trimethylolpropane, trimethylolbutane, di-(trimethylolpropane), tri-(trimethylolpropane), pentaerythritol, and dipentaerythritol, and more preferably pentaerythritol, dipentaerythritol, or a mixed alcohol of pentaerythritol and dipentaerythritol, in view of particularly excellent compatibility with a refrigerant and hydrolytic stability.

The complex ester may be synthesized, for example, by the following method (a) or (b):

(a) a method including: adjusting the molar ratio of polyhydric alcohol and polybasic acid, and synthesizing an ester intermediate in which some of the carboxyl groups of the polybasic acid remain unesterified, and then esterifying the remaining carboxyl groups with monohydric alcohol;

(b) a method including: adjusting the molar ratio of polyhydric alcohol and polybasic acid, and synthesizing an ester intermediate in which some of the hydroxy groups of the polyhydric alcohol remain unesterified, and then esterifying the remaining hydroxy groups with monocarboxylic fatty acid.

The complex ester obtained by the method (b) may produce relatively strong acid upon hydrolysis during use as a refrigerating machine oil, and thus tends to show somewhat inferior stability as compared with a complex ester which can be obtained by the method (a). Therefore, the complex ester is preferably a complex ester with more stability which is obtained by the method (a).

The complex ester is preferably an ester synthesized from at least one selected from a polyhydric alcohol having 2 to 4 hydroxy groups, at least one selected from a polybasic acid having 6 to 12 carbon atoms, and at least one selected from a monohydric alcohol having 4 to 18 carbon atoms and a monocarboxylic fatty acid having 2 to 12 carbon atoms.

Examples of the polyhydric alcohol having 2 to 4 hydroxy groups include neopentyl glycol, trimethylolpropane, pentaerythritol, and the like. The polyhydric alcohol having 2 to 4 hydroxy groups is preferably selected from neopentyl glycol and trimethylolpropane because suitable viscosity can be secured, and good low-temperature properties can be obtained when a complex ester is used as a base oil, and more preferably neopentyl glycol because viscosity can widely be adjusted.

Preferably, the polyhydric alcohol of the complex ester further include dihydric alcohol having 2 to 10 carbon atoms other than neopentyl glycol in addition to polyhydric alcohol having 2 to 4 hydroxy groups. Examples of the dihydric alcohol having 2 to 10 carbon atoms other than neopentyl glycol include ethylene glycol, propanediol, butanediol, pentanediol, hexanediol, 2-methyl-1,3-propanediol, 3-methyl-1,5-pentanediol, 2,2-diethyl-1,3-pentanediol, and the like. The above dihydric alcohol is preferably butanediol in view of excellent properties as a lubricating base oil. Examples of the butanediol include 1,2-butanediol, 1,3-butanediol, 1,4-butanediol, 2,3-butanediol, and the like. The butanediol is preferably selected from 1,3-butanediol and 1,4-butanediol in view of obtaining good properties. The amount of the dihydric alcohol having 2 to 10 carbon atoms other than neopentyl glycol is preferably 1.2 mole or less, more preferably 0.8 mole or less, and even more preferably 0.4 mole or less, based on 1 mole of the polyhydric alcohol having 2 to 4 hydroxy groups.

Examples of the polybasic acid having 6 to 12 carbon atoms include adipic acid, pimelic acid, suberic acid, azelaic acid, sebacic acid, phthalic acid, trimellitic acid, and the like. In view of excellently balanced properties of the synthesized esters and availability, the above polybasic acid is preferably selected from adipic acid and sebacic acid, and more preferably is adipic acid. The amount of the polybasic acid having 6 to 12 carbon atoms is preferably 0.4 mole to 4 mole, more preferably 0.5 mole to 3 mole, and even more preferably 0.6 mole to 2.5 mole, based on 1 mole of the polyhydric alcohol having 2 to 4 hydroxy groups.

Examples of the monohydric alcohol having 4 to 18 carbon atoms include aliphatic alcohols such as butanol, pentanol, hexanol, heptanol, octanol, nonanol, decanol, dodecanol, and oleyl alcohol. These monohydric alcohols may be linear or branched. Especially in view of balanced properties, the monohydric alcohol 4 to 18 carbon atoms is preferably monohydric alcohol 6 to 10 carbon atoms, and more preferably monohydric alcohol having 8 to 10 carbon atoms. The above monohydric alcohol is even more preferably selected from 2-ethylhexanol and 3,5,5-trimethylhexanol because the synthesized complex ester will have good low-temperature properties.

Examples of the monocarboxylic fatty acid having 2 to 12 carbon atoms include ethanoic acid, propanoic acid, butanoic acid, pentanoic acid, hexanoic acid, heptanoic acid, octanoic acid, nonanoic acid, decanoic acid, dodecanoic acid, and the like. Such monocarboxylic fatty acid may be linear or branched. The monocarboxylic fatty acid having 2 to 12 carbon atoms is preferably a monocarboxylic fatty acid having 8 to 10 carbon atoms, and is more preferably 2-ethylhexanoic acid and 3,5,5-trimethylhexanoic acid in view of low-temperature properties.

Examples of the ether include, polyvinyl ether, polyalkylene glycol, polyphenyl ether, perfluoroether, and mixtures thereof, and the like. The ether is preferably selected from a polyvinyl ether and a polyalkylene glycol, and is more preferably a polyvinyl ether.

The polyvinyl ether has a structural unit represented by the following formula (1):

wherein $R^{50}$, $R^{51}$ and $R^{52}$ may be the same or different from each other, and each represent a hydrogen atom or a hydrocarbon group, and $R^{53}$ represents a divalent hydrocarbon group or a divalent ether-linked oxygen-containing hydrocarbon group, and $R^{54}$ represents a hydrocarbon group, and m represents an integer of 0 or more. When m is 2 or more, multiple $R$s$^{53}$ may be the same or different from each other.

The number of carbon atoms of the hydrocarbon groups represented by $R^{50}$, $R^{51}$, and $R^{52}$ is preferably 1 or more, more preferably 2 or more, and more preferably 3 or more, and are preferably 8 or less, more preferably 7 or less, and even more preferably 6 or less. At least one of $R^{50}$, $R^{51}$, and $R^{52}$ is preferably a hydrogen atom, and more preferably, $R^{50}$, $R^{51}$, and $R^{52}$ are all hydrogen atoms.

The number of carbon atoms of the divalent hydrocarbon group and the ether-linked oxygen-containing hydrocarbon group represented by $R^{53}$ is preferably 1 or more, more preferably 2 or more, and even more preferably 3 or more, and are preferably 10 or less, more preferably 8 or less, and even more preferably 6 or less. The divalent ether-linked oxygen-containing hydrocarbon group represented by $R^{53}$, for example, may have oxygen on a side chain which can form an ether linkage.

$R^{54}$ is preferably a hydrocarbon group having 1 to 20 carbon atoms. Examples of this hydrocarbon group include an alkyl group, a cycloalkyl group, a phenyl group, an aryl group, an arylalkyl group, and the like. The above hydrocarbon group is preferably an alkyl group, more preferably an alkyl group having 1 to 5 carbon atoms.

m is preferably 0 or more, more preferably 1 or more, and even more preferably 2 or more, and is preferably 20 or less, more preferably 18 or less, and even more preferably 16 or less. The average value of m in the entire structure units of the polyvinyl ether is preferably 0 to 10.

The polyvinyl ether may be a homopolymer including one selected from the structural units represented by the formula (1), or may be a copolymer including two or more selected from the structural units represented by the formula (1), or may be a copolymer including a structural unit represented by the formula (1) and a different structural unit. When the polyvinyl ether is a copolymer, lubricity, insulation properties, hygroscopicity, and the like can be further improved while satisfying compatibility of a refrigerating machine oil with a refrigerant. In this case, appropriate selection of the types of raw monomers, the type of initiator, the ratio of structural units in a copolymer, and the like can confer the aforementioned various properties on the refrigerating machine oil. The copolymer may be either a block copolymer or a random copolymer.

When the polyvinyl ether is a copolymer, the copolymer preferably has a structural unit (1-1) represented by the above formula (1) wherein $R^{54}$ is an alkyl group having 1 to 3 carbon atoms and a structural unit (1-2) represented by the above formula (1) wherein $R^{54}$ is an alkyl group having 3 to 20 carbon atoms. The number of carbon atoms of $R^{54}$ in the structural unit (1-2) is preferably 3 to 10, more preferably 3 to 8. $R^{54}$ in the structural unit (1-1) is particularly preferably an ethyl group, and $R^{54}$ in the structural unit (1-2) is particularly preferably an isobutyl group. When the polyvinyl ether is a copolymer having the above structural units (1-1) and (1-2), the molar ratio of the structural trait (1-1) and the structural unit (1-2) is preferably 5:95 to 95:5, more preferably 20:80 to 90:10, and even more preferably 70:30 to 90:10. When the above molar ratio falls within the above ranges, compatibility with a refrigerant tends to be able to be further improved, and hygroscopicity tends to be able to be lowered.

The polyvinyl ether may consist of a structural unit represented by the above formula (1), or may be a copolymer further including a structural unit represented by the following formula (2). In the latter case, the copolymer may be either a block copolymer or a random copolymer.

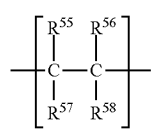

(2)

wherein $R^{55}$ to $R^{58}$ may be the same or different from each other, and each represent a hydrogen atom or a hydrocarbon group having 1 to 20 carbon atoms.

The polyvinyl ether may be manufactured by polymerizing a vinyl ether-based monomer corresponding to a structural unit represented by the formula (1), or by copolymering a vinyl ether-based monomer corresponding to a structural unit represented by the formula (1) with a hydrocarbon monomer having an olefinic double bond corresponding to a structural unit represented by the formula (2). As the vinyl ether-based monomer corresponding to a structural unit represented by the formula (1), a monomer represented by the following formula (3) is suitable:

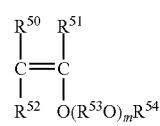

(3)

wherein $R^{50}$, $R^{51}$, $R^{52}$, $R^{53}$, $R^{54}$ and m have the same definition as defined for $R^{50}$, $R^{51}$, $R^{52}$, $R^{53}$, $R^{54}$ and m in the formula (1), respectively.

The polyvinyl ether preferably has the following terminal structure (I) or (II).

(I) A structure in which one end is represented by the formula (4) or (5) while the other end is represented by the formula (6) or (7).

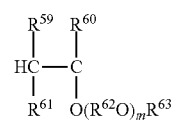

(4)

In the formula (4), $R^{59}$, $R^{60}$ and $R^{61}$ may be the same or different from each other, and each represent a hydrogen atom or a hydrocarbon group having 1 to 8 carbon atoms, and $R^{62}$ represents a divalent hydrocarbon group or a divalent ether-linked oxygen-containing hydrocarbon group having 1 to 10 carbon atoms, and $R^{63}$ represents a hydrocarbon group having 1 to 20 carbon atoms, and m has the same definition as defined for m in the formula (1). When m is 2 or more, multiple Rs$^{62}$ may be the same or different from each other.

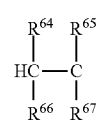

(5)

In the formula (5), $R^{64}$, $R^{65}$, $R^{66}$ and $R^{67}$ may be the same or different from each other, and each represent a hydrogen atom or a hydrocarbon group having 1 to 20 carbon atoms.

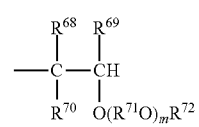

(6)

In the formula (6), $R^{68}$, $R^{69}$ and $R^{70}$ may be the same or different from each other, and each represent a hydrogen atom or a hydrocarbon group having 1 to 8 carbon atoms, and $R^{71}$ represents a divalent hydrocarbon group or a divalent ether-linked oxygen-containing hydrocarbon group having 1 to 10 carbon atoms, and $R^{72}$ represents a hydrocarbon group having 1 to 20 carbon atoms, and m has the same definition as defined for m in the formula (1). When m is 2 or more, multiple $Rs^{71}$ may be the same or different from each other.

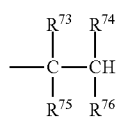

(7)

In the formula (7), $R^{73}$, $R^{74}$, $R^{75}$, and $R^{76}$ may be the same or different from each other, and each represent a hydrogen atom or a hydrocarbon group having 1 to 20 carbon atoms.

(II) A structure in which one end is represented by the above formula (4) or (5) while the other end is represented by the following formula (8):

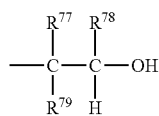

(8)

In the formula (8), $R^{77}$, $R^{78}$ and $R^{79}$ may be the same or different from each other, and each represent a hydrogen atom or a hydrocarbon group having 1 to 8 carbon atoms.

Among these polyvinyl ethers, those of (a), (b), (c), (d), and (e) listed below are particularly suitable as the base oil.

(a) A polyvinyl ether having a structure in which one end is represented by the formula (4) or (5), and the other end is represented by the formula (6) or (7), and in which $R^{50}$, $R^{51}$, and $R^{52}$ in the formula (1) are each a hydrogen atom, and m is an integer of 0 to 4, and $R^{53}$ is a divalent hydrocarbon group having 2 to 4 carbon atoms, and $R^{54}$ is a hydrocarbon group having 1 to 20 carbon atoms.

(b) A polyvinyl ether including only a structural unit represented by the formula (1) and having a structure in which one end is represented by the formula (4), and the other end is represented by the formula (6), and in which $R^{50}$, $R^{51}$, and $R^{52}$ in the formula (1) are each a hydrogen atom, and m is an integer of 0 to 4, and $R^{53}$ is a divalent hydrocarbon group having 2 to 4 carbon atoms, and $R^{54}$ is a hydrocarbon group having 1 to 20 carbon atoms.

(c) A polyvinyl ether having a structural in which one end is represented by the formula (4) or (5), and the other end is represented by the formula (8), and in which $R^{50}$, $R^{51}$, and $R^{52}$ in the formula (1) are each a hydrogen atom, and m is an integer of 0 to 4, and $R^{53}$ is a divalent hydrocarbon group having 2 to 4 carbon atoms, and $R^{54}$ is a hydrocarbon group having 1 to 20 carbon atoms.

(d) A polyvinyl ether including only a structural unit represented by the formula (1) and having a structure in which one end is represented by the formula (5), and the other end is represented by the formula (8), and in which $R^{50}$, $R^{51}$, and $R^{52}$ in the formula (1) are each a hydrogen atom, and m is an integer of 0 to 4, and $R^{53}$ is a divalent hydrocarbon group having 2 to 4 carbon atoms, and $R^{54}$ is a hydrocarbon group having 1 to 20 carbon atoms.

(e) A polyvinyl ether of any of the above (a), (b), (c) and (d) having a structural unit in which $R^{54}$ in the formula (1) is a hydrocarbon group having 1 to 3 carbon atoms and a structural unit in which $R^{54}$ in the formula (1) is a hydrocarbon group having 3 to 20 carbon atoms.

The weight average molecular weight of the polyvinyl ether is preferably 500 or more, more preferably 600 or more, and is also preferably 3000 or less, more preferably 2000 or less, and even more preferably 1500 or less. When the polyvinyl ether has a weight average molecular weight of 500 or more, the refrigerating machine oil can have superior lubricity in the presence of a refrigerant. When the weight average molecular weight is 3000 or less, a range of compositions within which compatibility with a refrigerant can be obtained under low-temperature conditions can be wider, and poor lubrication in a refrigerant compressor and deteriorated heat exchange in an evaporator can be prevented.

The number average molecular weight of the polyvinyl ether is preferably 500 or more, more preferably 600 or more, and is also preferably 3000 or less, more preferably 2000 or less, and even more preferably 1500 or less. When the polyvinyl ether has a number average molecular weight of 500 or more, the refrigerating machine oil can have superior lubricity in the presence of a refrigerant. When the number average molecular weight is 3000 or less, a range of compositions within which compatibility with a refrigerant can be obtained under low-temperature conditions can be wider, and poor lubrication in a refrigerant compressor and deteriorated heat exchange in an evaporator can be prevented.

The weight average molecular weight and number average molecular weight of the polyvinyl ether each refer to a value determined by the GPC analysis (in terms of polystyrene (standard sample)). For example, the weight average molecular weight and number average molecular weight can be determined as follows.

Dilution is performed using chloroform as a solvent to prepare a solution with a polyvinyl-ether concentration of 1% by mass. The solution is analyzed with a GPC instrument (Waters Alliance 2695). Analysis is performed with a refractive index detector at a solvent flow rate of 1 ml/min using a column capable of analyzing a molecular weight of 100 to 10000. It is noted that the relationship between column retention time and molecular weight is separately determined using a polystyrene standard having a known molecular weight to create a calibration curve, and the molecular weight of a sample is then determined from a measured retention time.

The polyvinyl ether preferably has a degrees of unsaturation of 0.04 meq/g or less, more preferably 0.03 meq/g or less, and even more preferably 0.02 meq/g or less. The polyvinyl ether preferably has a peroxide value of a 10.0 meq/kg or less, more preferably 5.0 meq/kg or less, and even more preferably 1.0 meq/kg or less. The polyvinyl ether preferably has a carbonyl value of 100 ppm by weight or less, more preferably 50 ppm by weight or less, and even more preferably 20 ppm by weight or less. The polyvinyl ether preferably has a hydroxy value of 10 mg KOH/g or less, more preferably 5 mg KOH/g or less, and even more preferably 3 mg KOH/g or less.

The degree of unsaturation, peroxide value, and carbonyl value in the present invention each refer to a value as measured in accordance with the Standard Methods for the Analysis of Fats, Oils and Related Materials defined by the Japan Oil Chemists' Society. That is, with regard to the degree of unsaturation in the present invention, a sample is allowed to react with a Wij's solution (a solution of ICl-acetic acid), and left stand in a dark place, and then excess ICl is reduced into iodine, and that iodine is subsequently titrated with sodium thiosulfate to calculate an iodine value. The iodine value is then converted into a value (meq/g) in terms of vinyl equivalent. This value is used as the degree of unsaturation. With regard to the peroxide value in the present invention, potassium iodide is added to a sample, and the resulting free iodine is titrated with sodium thiosulfate, and the amount of the free iodine determined is converted into a value (meq/kg) in milliequivalent per kg of the sample. This value is used as the peroxide value. With regard to the carbonyl value in the present invention, a sample is allowed to react with 2,4-dinitrophenylhydrazine to generate chromogenic quinonoid ions. The absorbance of the sample at 480 nm is measured and converted into a value (ppm by weight) in terms of the amount of carbonyl based on a calibration curve which is pre-determined using cinnamaldehyde as the standard substance. This value is used as the carbonyl value. The hydroxy value in the present invention is measured in accordance with JIS K0070:1992.

Examples of the polyalkylene glycol include polyethylene glycol, polypropylene glycol, polybutylene glycol, and the like. The polyalkylene glycol includes oxyethylene, oxypropylene, oxybutylene, or the like as a structural unit. Polyalkylene glycols having these structural units can be obtained by ring-opening polymerization of ethylene oxide, propylene oxide, or butylene oxide as a raw monomer material, respectively.

Examples of the polyalkylene glycol include, for example, compounds represented by the following formula (9):

$$R^{\alpha}-[(OR^{\beta})_f-OR^{\gamma}]_g \qquad (9)$$

wherein $R^{\alpha}$ represents a hydrogen atom, an alkyl group having 1 to 10 carbon atoms, an acyl group having 2 to 10 carbon atoms, or a residue of a compound having 2 to 8 hydroxy groups, and $R^{\beta}$ represents an alkylene group having 2 to 4 carbon atoms, and $R^{\gamma}$ represents a hydrogen atom, an alkyl group having 1 to 10 carbon atoms, or an acyl group having 2 to 10 carbon atoms, and f represents an integer of 1 to 80, and g represents an integer of 1 to 8.

The alkyl groups represented by $R^{\alpha}$ and $R^{\gamma}$ may be any of linear, branched, or cyclic. The number of carbon atoms of these alkyl groups is preferably 1 to 10, more preferably 1 to 6. When the number of carbon atoms of the alkyl groups is 10 or less, the refrigerating machine oil tends to have excellent compatibility with a refrigerant.

The alkyl-group moieties of the acyl groups represented by $R^{\alpha}$ and $R^{\gamma}$ may be any of linear, branched, or cyclic. The number of carbon atoms of the acyl groups is preferably 2 to 10, more preferably 2 to 6. When the number of carbon atoms of these acyl groups is 10 or less, the refrigerating machine oil tends to have excellent compatibility with a refrigerant, leading to less-likely occurrence of phase separation.

When the groups represented by $R^{\alpha}$ and $R^{\gamma}$ are both alkyl groups or both acyl groups, the groups represented by $R^{\alpha}$ and $R^{\gamma}$ may be the same or different. When g is 2 or more, the groups represented by multiple $Rs^{\alpha}$ and $Rs^{\gamma}$ in the same molecule may be the same or different.

When the group represented by $R^{\alpha}$ is a residue of a compound having 2 to 8 hydroxy groups, the compound may be chain or cyclic.

In view of excellent compatibility, at least one of $R^{\alpha}$ and $R\gamma$ is preferably an alkyl group, more preferably an alkyl group having 1 to 4 carbon atoms, and even more preferably a methyl group. In view of excellent heat and chemical stability, both of $R^{\alpha}$ and $R^{\gamma}$ are preferably alkyl groups, more preferably alkyl groups having 1 to 4 carbon atoms, and even more preferably methyl groups. In view of manufacturability and cost, one of $R^{\alpha}$ or $R^{\gamma}$ is preferably an alkyl group (more preferably an alkyl group having 1 to 4 carbon atoms) while the other is a hydrogen atom. More preferably, one is a methyl group while the other is a hydrogen atom. In view of excellent lubricity and sludge solubility, both of $R^{\alpha}$ and $R^{\gamma}$ are hydrogen atoms.

$R^{\beta}$ represents an alkylene group having 2 to 4 carbon atoms. Specific examples of such an alkylene group include an ethylene group, a propylene group, a butylene group, and the like. Further, examples of an oxyalkylene group as a repeating unit represented by $OR^{\beta}$ include an oxyethylene group, an oxypropylene group, and an oxybutylene group. The oxyalkylene groups represented by $(OR^{\beta})_f$ may include one type of oxyalkylene group, or may include two or more types of oxyalkylene groups.

The polyalkylene glycol represented by the formula (9) is preferably a copolymer including an oxyethylene group (EO) and an oxypropylene group (PO) in view of excellent compatibility with a refrigerant and viscosity-temperature properties. In this case, the ratio (EO/(PO+EO)) of the oxyethylene group to the total of the oxyethylene group and the oxypropylene group is preferably 0.1 to 0.8, more preferably 0.3 to 0.6 in view of excellent seizure load and viscosity-temperature properties. In view of excellent hygroscopicity and heat/oxidation stability, EO/(PO+EO) is preferably 0 to 0.5, more preferably 0 to 0.2, even more preferably 0 (that is, a homopolymer of propylene oxide).

f represents the number of repeats (the degree of polymerization) of the oxyalkylene group $OR^{\beta}$, and is an integer of 1 to 80. g is an integer of 1 to 8. For example, g is 1 when $R^{\alpha}$ is an alkyl group or an acyl group. When $R^{\alpha}$ is a residue of a compound having 2 to 8 hydroxy groups, g corresponds to the number of hydroxy groups in the compound.

In the polyalkylene glycol represented by the formula (9), the average value of the product (f×g) of f and g is preferably 6 to 80 because this will satisfy required performances as a refrigerating machine oil in a well balanced manner.

The weight average molecular weight of the polyalkylene glycol is preferably 500 or more, more preferably 600 or more, and is also preferably 3000 or less, more preferably 2000 or less, and even more preferably 1500 or less. When the polyalkylene glycol has a weight average molecular weight of 500 or more, the refrigerating machine oil can have superior lubricity in the presence of a refrigerant. When the weight average molecular weight is 3000 or less, a range of compositions within which the refrigerating machine oil shows compatibility with a refrigerant under low-temperature conditions can be wider, and poor lubrication in a refrigerant compressor and deteriorated heat exchange in an evaporator can be prevented.

The number average molecular weight of the polyalkylene glycol is preferably 500 or more, more preferably 600 or more, and is also preferably 3000 or less, more preferably 2000 or less, and even more preferably 1500 or less. When the polyalkylene glycol has a number average molecular weight of 500 or more, the refrigerating machine oil can have superior lubricity in the presence of a refrigerant. When the number average molecular weight is 3000 or less, a range of compositions within which the refrigerating machine oil shows compatibility with a refrigerant under low-temperature conditions can be wider, and poor lubrication in a refrigerant compressor and deteriorated heat exchange in an evaporator can be prevented.

The weight average molecular weight and number average molecular weight of the polyalkylene glycol each refer to a value determined by GPC analysis (in terms of polypropylene glycol (standard sample)). For example, the weight average molecular weight and number average molecular weight can be determined as follows.

Dilution is performed using chloroform as a solvent to prepare a solution with a polyalkylene-glycol concentration of 1% by mass. The solution is analyzed with a GPC instrument (Waters Alliance 2695). Analysis is performed with a refractive index detector at a solvent flow rate of 1 ml/min using a column capable of analyzing a molecular weight of 100 to 10000. It is noted that the relationship between column retention time and molecular weight is separately determined using a polyalkylene glycol standard having a known molecular weight to create a calibration curve, and the molecular weight of a sample is then determined from a measured retention time.

The hydroxy value of the polyalkylene glycol is preferably 100 mg KOH/g or less, more preferably 50 mg KOH/g or less, even more preferably 30 mg KOH/g or less, and most preferably 10 mg KOH/g or less.

The polyalkylene glycol can be synthesized by a known method (Mitsuta Shibata et al., "alkylene oxide polymer," Kaibundo Publishing Co., Ltd., Nov. 20, 1990). For example, one or more predetermined alkylene oxides are addition-polymerized with alcohol ($R^{\alpha}OH$; $R^{\alpha}$ has the same definition as defined for $R^{\alpha}$ in the formula (9)), and terminal hydroxyl groups are further etherified or esterified to obtain the polyalkylene glycol represented by the formula (9). When two or more alkylene oxides are used in the above manufacturing process, the obtained polyalkylene glycol may be either a random copolymer or a block copolymer, but is preferably a block copolymer in view of the tendency of having superior oxidation stability and lubricity, and preferably a random copolymer in view of the tendency of having superior low-temperature fluidity.

The polyalkylene glycol preferably has a degrees of unsaturation of 0.04 meq/g or less, more preferably 0.03 meq/g or less, and even more preferably 0.02 meq/g or less. The polyalkylene glycol preferably has a peroxide value of a 10.0 meq/kg or less, more preferably 5.0 meq/kg or less, and even more preferably 1.0 meq/kg or less. The polyalkylene glycol preferably has a carbonyl value of 100 ppm by weight or less, more preferably 50 ppm by weight or less, and even more preferably 20 ppm by weight or less.

The lubricating base oil is preferably at least one selected from oxygen-containing oils, more preferably at least one selected from esters and ethers, and is even more preferably an ester.

The kinematic viscosity at 40° C. of the lubricating base oil is preferably 3 mm²/s or more, more preferably 4 mm²/s or more, and even more preferably 5 mm²/s or more. The kinematic viscosity at 40° C. of the lubricating base oil is preferably 1000 mm²/s or less, more preferably 500 mm²/s or less, and even more preferably 400 mm²/s or less. The kinematic viscosity at 100° C. of the lubricating base oil is preferably 1 mm²/s or more, more preferably 2 mm²/s or more. The kinematic viscosity at 100° C. of the lubricating base oil is preferably 100 mm²/s or less, more preferably 50 mm²/s or less. The kinematic viscosity in the present invention is measured in accordance with JIS K2283:2000.

The content of the lubricating base oil may be 50% by mass or more, 60% by mass or more, 70% by mass or more, 80% by mass or more, or 90% by mass or more, based on the total amount of the refrigerating machine oil.

The refrigerating machine oil include the compound represented by the following formula (A).

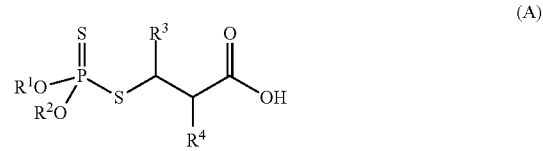

In the formula, $R^1$ and $R^2$ each independently represent a monovalent hydrocarbon group, preferably a chain or cyclic alkyl group, more preferably a chain alkyl group, and even more preferably a branched alkyl group. The number of carbon atoms of the above monovalent hydrocarbon group and alkyl groups preferably is 3 to 9, 3 to 8, 4 to 9, 4 to 8, 4 to 7, 4 to 6, 4 to 5, or 4.

$R^3$ and $R^4$ each independently represent a hydrogen atom or an alkyl group. The above alkyl group may be either linear or branched, and is preferably linear. The number of carbon atoms of the above alkyl group may be, for example, 1 to 4, 1 to 3, or 1 to 2. It is preferable that at least one of $R^3$ and $R^4$ is an alkyl group. It is more preferably that one of $R^3$ and $R^4$ is an alkyl group, and the other is a hydrogen atom. That is, the compound represented by the formula (A) is preferably represented by the following formula (a-1) or (a-2):

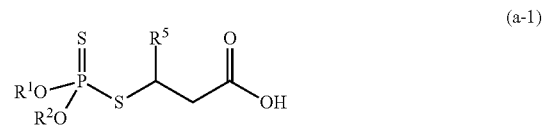

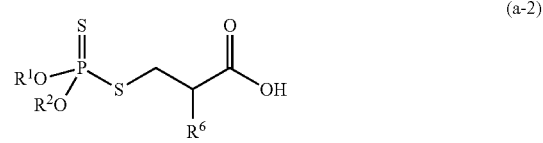

wherein $R^1$ and $R^2$ have the same definition as $R^1$ and $R^2$ defined for the formula (A), respectively, and $R^5$ and $R^6$ each represent an alkyl group. The above alkyl group may be either linear or branched, and is preferably linear. The number of carbon atoms of the above alkyl group is preferably 1 to 4, 1 to 3, 1 to 2, or 1.

The content of the compound represented by the formula (A) may be 0.001% by mass or more, 0.005% by mass or more, 0.01% by mass or more, and may be 20% by mass or less, 10% by mass or less, or 5% by mass or less, based on the total amount of a refrigerating machine oil. The content of the compound represented by the formula (A) is 0.001 to 20% by mass, 0.001 to 10% by mass, 0.001 to 5% by mass, 0.005 to 20% by mass, 0.005 to 10% by mass, 0.005 to 5% by mass, 0.01 to 20% by mass, 0.01 to 10% by mass, or 0.01 to 5% by mass, based on the total amount of the refrigerating machine oil.

The refrigerating machine oil may further include another additive other than the compound represented by the formula (A). Examples of another additive include acid scavengers, antioxidants, extreme pressure agents, oiliness agents, antifoaming agents, metal deactivators, antiwear agents, viscosity index improvers, pour point depressants, detergent-dispersants, and the like. The contents of these additives may be 10% by mass or less or 5% by mass or less based on the total amount of the refrigerating machine oil.

Preferably, the refrigerating machine oil further include an acid scavenger among the above additives in view of improved heat and chemical stability. Examples of the acid scavengers include epoxy compounds and carbodiimide compounds. There is no particular limitation for the epoxy compounds, but the epoxy compounds include glycidyl ether-based epoxy compounds, glycidyl ester-based epoxy compounds, oxirane compounds, alkyl oxirane compounds, alicyclic epoxy compounds, epoxidized fatty acid monoesters, epoxidized plant oils, and the like.

Preferably, the refrigerating machine oil further includes an antioxidant among the above additives. Examples of the antioxidants include phenolic antioxidants such as di-tert-.butyl-p-cresol; amine-based antioxidants such as alkyl diphenylamine; and the like.

The kinematic viscosity at 40° C. of the refrigerating machine oil may be preferably 3 $mm^2/s$ or more, more preferably 4 $mm^2/s$ or more, and even more preferably 5 $mm^2/s$ or more. The kinematic viscosity at 40° C. of the refrigerating machine oil may be preferably 500 $mm^2/s$ or less, more preferably 400 $mm^2/s$ or less, and even more preferably 300 $mm^2/s$ or less.

The kinematic viscosity at 100° C. of the refrigerating machine oil may be preferably 1 $mm^2/s$ or more, and more preferably 2 $mm^2/s$ or more. The kinematic viscosity at 100° C. of the refrigerating machine oil may be 100 $mm^2/s$ or less, and more preferably 50 $mm^2/s$ or less.

The pour point of the refrigerating machine oil may be preferably −10° C. or less, and more preferably −20° C. or less. The pour point in the present invention is measured in accordance with HS K2269-1987.

The volume resistivity of the refrigerating machine oil may be preferably $1.0 \times 10^9$ Ω·m or more, more preferably $1.0 \times 10^{10}$ Ω·m or more, and even more preferably $1.0 \times 10^{11}$ Ω·m or more. The volume resistivity in the present invention is measured at 25° C. in accordance with HS C2101:1999.

The moisture content of the refrigerating machine oil may be preferably 200 ppm or less, more preferably 100 ppm or less, and even more preferably 50 ppm or less, based on the total amount of the refrigerating machine oil.

The acid value of the refrigerating machine oil may be 1.0 mg KOH/g or less, and more preferably 0.1 mg KOH/g or less. The acid value in the present invention is measured in accordance with JIS K2501:2003.

The ash content of the refrigerating machine oil may be preferably 100 ppm or less, and more preferably 50 ppm or less. The ash content in the present invention is measured in accordance with JIS K2272:1998.

The refrigerating machine oil according to the present embodiment is used in the presence of a refrigerant including an unsaturated hydrofluorocarbon (HFO). The unsaturated hydrofluorocarbon may preferably have one chlorine atom in the molecule. The unsaturated hydrofluorocarbon is preferably an unsaturated hydrofluorocarbon having 2 to 4 carbon atoms, specifically a fluoroethylene, a fluoropropene, and a fluorobutene, more preferably a fluoroethylene and a fluoropropene, even more preferably a fluoroethylene having 3 to 5 fluorine atoms, and a fluoropropene having 3 to 5 fluorine atoms, and particularly preferably a fluoroethylene having 3 to 5 fluorine atoms.

The unsaturated hydrofluorocarbon is preferably a mixture of any one or two or more of 1,1,2-trifluoroethylene (HFO-1123), 1,2,3,3,3-pentafluoropropene (HFO-1225ye), 1,3,3,3-tetrafluoropropene (HFO-1234ze), 2,3,3,3-tetrafluoropropene (HFO-1234yf), 1,2,3,3-tetrafluoropropene (BFO-1234ye), and 3,3,3-trifluoropropene (HFO-1243zf), (Z)-1,1,1,4,4,4-hexafluoro-2-butene (HFO-1336mzz), cis-1-chloro-3,3,3-trifluoropropene (1233zd (Z)), and trans-1-chloro-3,3,3-trifluoropropene (1233zd (E)), cis-1-chloro-2,3,3,3-tetrafluoropropene (HCFO-1224yd (Z)), trans-1-chloro-2,3,3,3-tetrafluoropropene (HCFO-1224yd (E)). The unsaturated hydrofluorocarbon is preferably one or two or more selected from HFO-1225ye, HFO-1234ze, and HFO-1234yf in view of physical properties as a refrigerant. When a refrigerating machine is operated having a refrigerant including the above unsaturated hydrofluorocarbon and the aforementioned refrigerating machine oil in combination, an effect for preventing decomposition of the refrigerant can be obtained.

The unsaturated hydrofluorocarbon preferably includes 1,1,2-trifluoroethylene (HFO-1123). In a case where a refrigerant includes 1,1,2-trifluoroethylene, a significant effect for preventing decomposition of the refrigerant can be obtained when a refrigerating machine is operated having the above refrigerant and the aforementioned refrigerating machine oil in combination. When a refrigerant includes 1,1,2-trifluoroethylene, the content of 1,1,2-trifluoroethylene is preferably 95% by mass or less, more preferably 80% by mass or less, and even more preferably 70% by mass or less, and is preferably 5% by mass or more, more preferably 20% by mass or more, even more preferably 30% by mass or more, and particularly preferably 35% by mass or more, based on the total amount of the refrigerant, in order to further improve the stability thereof.

When 1,1,2-trifluoroethylene is used as the unsaturated hydrofluorocarbon, a saturated hydrofluorocarbon such as difluoromethane (R32) as described below is preferably used together in order to further improve the stability thereof. When 1,1,2-trifluoroethylene is used in combination with a saturated hydrofluorocarbon, the mixing ratio (saturated hydrofluorocarbon/1,1,2-trifluoroethylene) may be, for example, 5 to 95% by mass/95 to 5% by mass, preferably 20 to 80% by mass/80 to 20% by mass, and may be more preferably 30 to 70% by mass/70 to 30% by mass, even more preferably 40 to 60% by mass/60 to 40% by mass. When 1,1,2-trifluoroethylene is used in combination with a saturated hydrofluorocarbon, the refrigerant may further include an unsaturated hydrofluorocarbon other than 1,1,2-trifluoroethylene in order to further reduce GWP. In this case, the content of an unsaturated hydrofluorocarbon other than 1,1,2-trifluoroethylene is preferably 5% by mass or more, more preferably 20% by mass or more, and even more preferably 30% by mass or more, and is preferably 95% by mass or less, more preferably 80% by mass or less, and even more preferably 70% by mass or less, based on the total amount of the refrigerant.

The refrigerant may further include another refrigerant in addition to an unsaturated hydrofluorocarbon. Examples of another refrigerant include a saturated hydrofluorocarbon (HFC) refrigerant; a natural refrigerant such as hydrocarbon, ammonia, and carbon dioxide (R744); a fluorine-containing ether-based refrigerant such as perfluoroether; a bis(trifluoromethyl)sulfide refrigerant; and a trifluoroiodomethane refrigerant.

Examples of the saturated hydrofluorocarbon include saturated hydrofluorocarbons preferably having 1 to 3 carbon atoms, more preferably having 1 to 2 carbon atoms. Specific examples include difluoromethane (R32), trifluoromethane (R23), pentafluoroethane (R125), 1,1,2,2-tetrafluoroethane (R134), 1,1,1,2-tetrafluoroethane (R134a), 1,1,1-trifluoroethane (R143a), 1,1-difluoroethane (R152a), fluoroethane (R161), 1,1,1,2,3,3,3-heptafluoropropane (R227ea), 1,1,1,2,3,3-hexafluoropropane (R236ea), 1,1,1,3,3,3-hexafluoropropane (R236fa), 1,1,1,3,3-pentafluoropropane (R245fa), and 1,1,1,3,3-pentafluorobutane (R365mfc), or mixtures of two or more of these.

The saturated hydrofluorocarbon (HFC) may be appropriately selected from the above, depending on uses and required performances, but preferred examples include R32 alone; R23 alone; R134a alone; R125 alone; a mixture of R134a/R32=60 to 80% by mass/40 to 20% by mass; a mixture of R32/R125=40 to 70% by mass/60 to 30% by mass; a mixture of R125/R143a=40 to 60% by mass/60 to 40% by mass; a mixture of R134a/R32/R125=60% by mass/30% by mass/10% by mass; a mixture of R134a/R32/R125=40 to 70% by mass/15 to 35% by mass/5 to 40% by mass; a mixture of R125/R134a/R143a=35 to 55% by mass/1 to 15% by mass/40 to 60% by mass; and the like. More specifically, a mixture of R134a/R32=70/30% by mass; a mixture of R32/R125=60/40% by mass; a mixture of R32/R125=50/50% by mass (R410A); a mixture of R32/R125=45/55% by mass (R410B); a mixture of R125/R143a=50/50% by mass (R507C); a mixture of R32/R125/R134a=30/10/60% by mass; a mixture of R32/R125/R134a=23/25/52% by mass (R407C); a mixture of R32/R125/R134a=25/15/60% by mass (R407E); a mixture of R125/R134 a/R143a=44/4/52% by mass (R404A); and the like can be used.

The hydrocarbon is preferably has a hydrocarbon having 1 to 5 carbon atoms, and more preferably a hydrocarbon having 2 to 4 carbon atoms. Specific examples of the hydrocarbon include methane, ethylene, ethane, propylene, propane (R290), cyclopropane, normal butane, isobutane (R600a), cyclobutane, methylcyclopropane, 2-methylbutane, normal pentane, or mixtures of two or more of these. Among these, a hydrocarbon in a gaseous form at 25° C. and 1 atmosphere is preferably used, and propane, normal butane, isobutane, 2-methylbutane, or mixtures thereof are more preferably used.

The refrigerating machine oil according to the present embodiment may be used along with a mixed refrigerant including an unsaturated hydrofluorocarbon (HFO) and a saturated hydrofluorocarbon (HFC). The mixing ratio (saturated hydrofluorocarbon (HFC)/unsaturated hydrofluorocarbon (HFO)) in the mixed refrigerant may be, for example, 5 to 95% by mass/95 to 5% by mass, preferably 10 to 90% by mass/90 to 10% by mass. The above mixed refrigerant may further include a natural refrigerant as described above (particularly R600a, R744, and the like). The content of the natural refrigerant is preferably 15% by mass or less, more preferably 10% by mass or less, and even more preferably 8% by mass or less, and is preferably 2% by mass or more, based on the total amount of the mixed refrigerant.

As the above mixed refrigerant, a mixed refrigerant having a global warming potential (GWP) of 1000 to 1500 can be used, for example, a mixture (R448A, GWP=1273) of R32/R134a/R125/HFO-1234yf/HFO-1234ze=26/21/26/20/7% by mass; a mixture (R449A, GWP=1392) of R32/R134a/R125/HFO-1234yf=24.3/25.7/24.7/25.3% by mass; and the like. As the above mixed refrigerant, a mixed refrigerant having a global warming potential (GWP) of 250 to less than 1000 can be used, for example, a mixture (R452B, GWP=677) of R32/R125/HFO-1234yf=67/7/26% by mass; a mixture (R454B, GWP=464) of R32/HFO-1234yf=69/31 mass %; a mixture (R447A, GWP=570) of R32/R125/HFO-1234ze=68/15/28.5% by mass; a mixture (R447B, GWP=710) of R32/R125/HFO-1234ze=68/8/24% by mass; a mixture (R446A, GWP=470) of R32/HFO-1234ze/R600a=68/29/3% by mass; a mixture (R513A, GWP=631) of R134a/HFO-1234yf=44/56 mass %; a R32/FIFO-1123 mixed refrigerant (for example, a mixture of R32/HFO-1123=60 to 40% by mass/40 to 60% by mass, GWP=405 to 270); and the like. As the above mixed refrigerant, a mixed refrigerant having a global warming potential (GWP) of more than 0 and less than 200 can be used, for example, a mixture (R444A, GWP=90) of R32/R152a/HFO-1234ze=12/5/83% by mass; a mixture (R445A, GWP=130) of R134a/HFO-1234ze/R744=9/85/6% by mass; a mixture (AC6A, GWP=147) of R134a/HFO-1234ze/R744=10.56/83.73/5.71% by mass; a mixture (R455A, GWP=148) of R32/HFO-1234yf/R744=21.5/75.5/3% by mass; and the like. In addition to these, examples of a mixed refrigerant including an unsaturated hydrofluorocarbon (HFO) and a saturated hydrofluorocarbon (HFC) include R449C, R454C, R456A, R457A, R458A, R459A, R459B, R460B, R461A, R513A, and the like. These can also suitably be used in combination with the refrigerating machine oil according to the present embodiment.

In a refrigerating machine, the refrigerating machine oil according to the present embodiment is usually present in a form of a working fluid composition for a refrigerating machine in which the refrigerating machine oil is mixed with a refrigerant. That is, the working fluid composition for a refrigerating machine according to the present embodiment includes the aforementioned refrigerating machine oil and a refrigerant as described above. The content of the refrigerating machine oil in the working fluid composition for a refrigerating machine may be preferably 1 to 500 parts by mass, more preferably 2 to 400 parts by mass, based on 100 parts by mass of the refrigerant.

The refrigerating machine oil and the working fluid composition for a refrigerating machine according to the present embodiment may suitably be used in air-conditioners having reciprocating or rotary hermetic compressors; refrigerators; open or closed car air-conditioners; dehumidifiers; water heaters; freezers; fridge-freezer warehouse; automatic vending machines; showcases; refrigerating machines in chemical plants; refrigerating machines having centrifugal compressors; and the like.

EXAMPLES

The present invention will be described in more detail with reference to Examples below, but the present invention shall not be limited to these Examples.

In Examples and Comparative Examples, refrigerating machine oils having the compositions (in % by mass based on the total amount of a refrigerating machine oil) shown in Table 1 were prepared using the base oil and additives as described below.

(Base Oil)

Ester of pentaerythritol and an acid mixture (mass ratio: 50/50) of 2-ethylhexanoic acid/3,5,5-trimethylhexanoic acid (Additives)

A1: compound represented by the following formula (A-1):

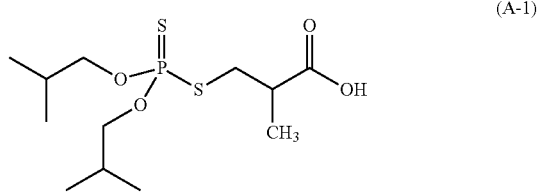 [SMILES: CC(C)COP(=S)(OCC(C)C)SCC(C)C(=O)O]

B1: antioxidant (2,6-di-tert.-butyl-p-cresol)
C1: acid scavenger (glycidyl neodecanoate)

The obtained refrigerating machine oils were each evaluated by the compressor endurance test for whether decomposition products of a refrigerant were present. The compressor endurance test was similar to the actual product test. The compressor endurance test was performed under the following conditions.

Compressor: 1 HP, a rotary compressor
Refrigerant: a mixed refrigerant of difluoromethane (R32) and trifluoroethylene (HFO-1123) (mass ratio (R32/HFO-1123)=60/40, GWP=405)
Discharge pressure: 4 MPa
Inlet pressure: 1 MPa
Test duration: 1000 hours The test was performed with a refrigerating cycle including a compressor, a condenser, an expansion valve (needle valve), and an evaporator, but not a dryer. After the test, the refrigerating machine oil inside a compressor was collected, and evaluated for whether a decomposition product of the refrigerant was generated based on detection of a fluorine ion in the refrigerating machine oil. Specifically, polar compounds in the collected refrigerating machine oil were extracted into water, and then the amount of fluorine ions in the aqueous phase was determined by ion chromatography in accordance with JIS K0102 to calculate the amount of fluorine ions in the refrigerating machine oil. The generation of decomposition products of refrigerant was evaluated as "Yes" when the amount of fluorine ions is 1 ppm or more, while evaluated as "No" when the amount of fluorine ions is less than 1 ppm. The results are shown in Table 1.

TABLE 1

| Composition (% by mass) | | Example 1 | Example 2 | Example 3 | Comp. Example 1 | Comp. Example 2 | Comp. Example 3 |
| --- | --- | --- | --- | --- | --- | --- | --- |
| Composition (% by mass) | Base oil | balance | balance | balance | balance | balance | balance |
| | A1 | 0.05 | 0.08 | 0.03 | — | — | — |
| | B1 | — | 0.3 | — | 0.3 | — | 0.3 |
| | C1 | — | — | 1 | — | 1 | 1 |
| Generation of decomposition products of refrigerant | | No | No | No | Yes | Yes | Yes |

The invention claimed is:

1. A refrigerating machine oil comprising:
a lubricating base oil comprising polyol esters; and
a compound represented by the following formula (A):

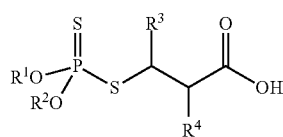

(A)

wherein R1 and R2 each independently represent a chain alkyl group having 3 to 9 carbon atoms, R3 represents a hydrogen atom, and R4 represents a linear or branched alkyl group having 1 to 4 carbon atoms, and
wherein a content of the compound represented by the formula (A) is 0.03% by mass or more based on the total amount of the refrigerating machine oil,
the refrigerating machine oil being used with a refrigerant comprising an unsaturated hydrofluorocarbon.

2. The refrigerating machine oil according to claim 1, comprising, as the lubricating base oil, an ester of a polyhydric alcohol and a fatty acid comprising 50 to 100% by mole of a branched fatty acid having 4 to 9 carbon atoms.

3. The refrigerating machine oil according to claim 1, wherein the refrigerant comprises 1,1,2-trifluoroethylene as the unsaturated hydrofluorocarbon.

4. The refrigerating machine oil according to claim 1, wherein the refrigerant further comprises a saturated hydrofluorocarbon.

5. The refrigerating machine oil according to claim 1, wherein
R1 and R2 each independently represent a branched alkyl group having 4 to 6 carbon atoms, and
R4 represents a linear alkyl group having 1 to 2 carbon atoms.

6. The refrigerating machine oil according to claim 1, wherein the compound represented by the formula (A) is compound represented by the following formula (A-1).

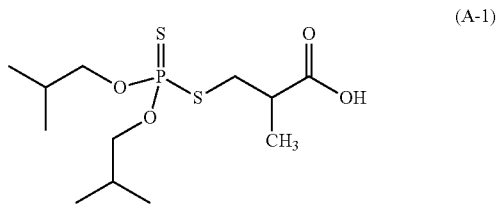 [SMILES: CC(C)COP(=S)(OCC(C)C)SCC(C)C(=O)O]

(A-1)

7. The refrigerating machine oil according to claim 1, wherein the compound represented by the formula (A) is compound represented by the following formula (A-1):

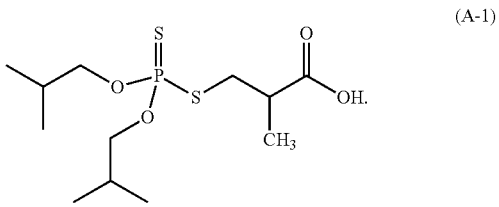 [SMILES: CC(C)COP(=S)(OCC(C)C)SCC(C)C(=O)O]

(A-1)

8. The refrigerating machine oil according to claim 1, wherein a content of the compound represented by the formula (A) is 0.08% by mass or less based on the total amount of the refrigerating machine oil.

9. The refrigerating machine oil according to claim 1, wherein the compound represented by the formula (A) is compound represented by the following formula (A-1):

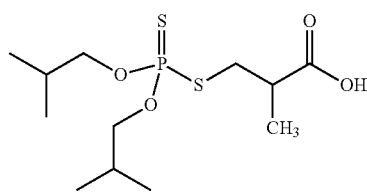

and wherein a content of the compound represented by the formula (A) is 0.03% by mass or more and 0.08% by mass or less, based on the total amount of the refrigerating machine oil.

10. A working fluid composition for a refrigerating machine, comprising:
a refrigerant comprising an unsaturated hydrofluorocarbon; and
a refrigerating machine oil comprising:
a lubricating base oil comprising polyol esters; and
a compound represented by the following formula (A):

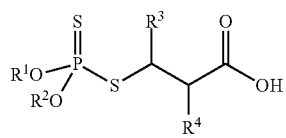

wherein R1 and R2 each independently represent a chain alkyl group having 3 to 9 carbon atoms, R3 represents a hydrogen atom, and R4 represents a linear or branched alkyl group having 1 to 4 carbon atoms,
wherein a content of the compound represented by the formula (A) is 0.03% by mass or more based on the total amount of the refrigerating machine oil.

11. The working fluid composition for a refrigerating machine according to claim 10, wherein the refrigerant comprises 1,1,2-trifluoroethylene as the unsaturated hydrofluorocarbon.

12. The working fluid composition for a refrigerating machine according to claim 10, wherein the refrigerant further comprises a saturated hydrofluorocarbon.

13. The working fluid composition for a refrigerating machine according to claim 10, wherein the refrigerating machine oil comprises, as the lubricating base oil, an ester of a polyhydric alcohol and a fatty acid comprising 50 to 100% by mole of a branched fatty acid having 4 to 9 carbon atoms.

14. The working fluid composition for a refrigerating machine according to claim 10, wherein R1 and R2 each independently represent a branched alkyl group having 4 to 6 carbon atoms, R3 represents a hydrogen atom, and R4 represents a linear alkyl group having 1 to 2 carbon atoms.

15. The working fluid composition for a refrigerating machine according to claim 10, wherein the compound represented by the formula (A) is compound represented by the following formula (A-1).

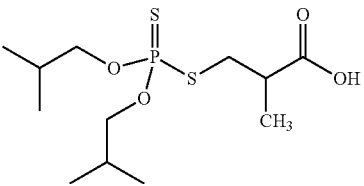

16. The working fluid composition for a refrigerating machine according to claim 10, wherein the compound represented by the formula (A) is compound represented by the following formula (A-1):

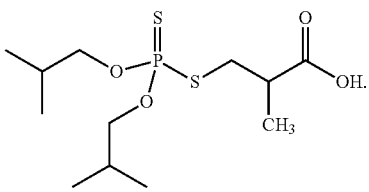

17. The working fluid composition for a refrigerating machine according to claim 10, wherein a content of the compound represented by the formula (A) is 0.08% by mass or less based on the total amount of the refrigerating machine oil.

18. The working fluid composition for a refrigerating machine according to claim 10, wherein the compound represented by the formula (A) is compound represented by the following formula (A-1):

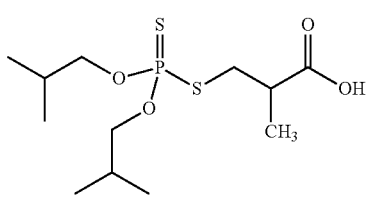

and wherein a content of the compound represented by the formula (A) is 0.03% by mass or more and 0.08% by mass or less, based on the total amount of the refrigerating machine oil.

* * * * *